United States Patent
Kanno

(12) 
(10) Patent No.: US 6,377,879 B2
(45) Date of Patent: *Apr. 23, 2002

(54) SYSTEM AND METHODS FOR ENCODING, TRANSMITTING, AND DISPLAYING ENGINE OPERATION DATA

(75) Inventor: Isao Kanno, Shizuoka (JP)

(73) Assignee: Sanshin Kogyo Kabushiki Kaisha (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/429,668

(22) Filed: Oct. 26, 1999

(30) Foreign Application Priority Data

Oct. 26, 1998 (JP) .......................................... 10-303554

(51) Int. Cl.[7] .............................................. B63H 21/22
(52) U.S. Cl. .............................. 701/29; 440/2; 440/87; 324/207.25; 327/73
(58) Field of Search .............. 701/29, 102; 123/339.11, 123/406.53, 425; 324/166, 207.25, 173; 327/4; 307/235 R; 440/1, 84, 87

(56) References Cited

U.S. PATENT DOCUMENTS

| | | | | | |
|---|---|---|---|---|---|
| 4,251,774 A | * | 2/1981 | Knodler | ....................... | 324/884 |
| 5,477,142 A | * | 12/1995 | Good et al. | .................. | 324/166 |
| 5,554,057 A | * | 9/1996 | Abe et al. | ..................... | 440/89 |
| 5,597,952 A | * | 1/1997 | Struyk | ...................... | 73/170.14 |
| 5,903,156 A | * | 5/1999 | Matsumaru et al. | ........ | 324/523 |
| 5,913,911 A | * | 6/1999 | Beck et al. | ...................... | 701/1 |
| 6,015,319 A | * | 1/2000 | Tanaka | .......................... | 440/84 |
| 6,086,435 A | * | 7/2000 | Hoshiba et al. | ................. | 440/1 |

* cited by examiner

*Primary Examiner*—Tan Nguyen
*Assistant Examiner*—Tuan C To
(74) *Attorney, Agent, or Firm*—Knobbe Martens Olson & Bear LLP

(57) ABSTRACT

The present vehicle data system collects, encodes, transmits, decodes, and displays engine and vehicle operation information. In one mode, an engine control unit of an outboard boat motor receives a plurality of engine and vehicle operation parameters from a plurality of sensors. The engine control unit encodes the plurality of parameters in a single signal and transmits the encoded signal to a display unit over a signal line. The display unit decodes the encoded signal to extract the plurality of parameters and displays the extracted parameters to the vehicle operator.

22 Claims, 9 Drawing Sheets

SYSTEM AND METHODS FOR ENCODING, TRANSMITTING, AND DISPLAYING ENGINE OPERATION DATA

PRIORITY INFORMATION

This application is based on and claims priority to Japanese Patent Application No. 10-303554 filed Oct. 26, 1998, the entire contents of which is hereby expressly incorporated by reference.

BACKGROUND OF THE INVENTION

1. Field of the Invention

This invention relates generally to engine operation gauges and, more particularly, the invention relates to the encoding of various engine operation data for transmission over a signal line to a decoding receiver.

2. Description of the Related Art

Land and water vehicles typically display engine and/or vehicle operation information to the operator. Operation parameters such as, for example, vehicle speed, engine speed, engine temperature, and engine oil pressure are each typically displayed by a meter or gauge. A sensor senses the operation parameter and transmits the information to the gauge through a transmission medium such as a wire in the wiring harness of the vehicle. In typical applications, one wire carries information from each sensor to its associated gauge. Therefore, if there are numerous sensors and gauges, there will be numerous wires. A large number of wires is disadvantageous as the wires take up space, add weight, add more possible points of failure, and make fault detection more difficult.

For example, a watercraft that employ an internal combustion engine as a prime mover often uses a pulse generating mechanism to determine engine speed. Pulse signals commonly are generated by a pulsar coil on a flywheel magneto as a crankshaft of the engine rotates. These signals are sent to a remote display unit located near the operating controls of the watercraft.

The conventional engine speed display mechanism involves an engine speed sensor, which includes a pulse generating device (e.g., a pulsar coil), an engine speed display unit, and a wiring harness for connecting the speed sensor to the display unit. The watercraft also includes other sensors and controlled components disposed on or near the engine, e.g., a trim sensor and an electronic control unit (ECU). The wiring harness also connects these components to the display unit. The larger number of wires within the harness requires more time to install the engine and other components in the watercraft, thereby increasing manufacturing costs and complicating assembly of the watercraft.

SUMMARY OF THE INVENTION

The present invention involves systems and methods for collecting, encoding, transmitting, decoding, and displaying engine and vehicle operation information. In a preferred embodiment, such as, for example an engine control unit of an outboard boat motor, receives a plurality of engine and vehicle operation parameters from a plurality of sensors. The controller encodes the plurality of parameters in a single signal and transmits the encoded signal to a display unit over a signal line. The display unit decodes the encoded signal to extract the plurality of parameters and displays the extracted parameters to the vehicle operator.

In accordance with one aspect of the system, the controller encodes a first operation parameter as a pulse signal having a frequency related to the value of the first operation parameter. The controller also encodes a second operation parameter by adjusting the width of the pulse signal in relation to the value of the second operation parameter. The controller also encodes a third operation parameter by adjusting the height (i.e., amplitude) of the pulse signal in relation to the third operation parameter. A receiver (e.g., a display unit) decodes the pulse signal to extract the first, the second, and the third operation parameters based upon the frequency, the pulse width, and the pulse height, respectively, of the pulse signal. The three operation parameters can thus be advantageously transmitted through one signal line using the same pulse signal. Of course, other forms of time-varying periodic signals can be used as well with this system.

In accordance with another aspect of the system, a controller encodes an operation parameter as a pulse signal. The controller preferably scales the parameter to have a frequency in a first frequency range. The frequency is then offset by a constant value to produce an offset frequency occurring in a second frequency range. The second frequency range does not overlap with the first frequency range. The controller transmits the pulse signal at the offset frequency to a receiver. The receiver decodes the offset frequency to determine the value of the parameter.

In accordance with an additional aspect of the invention, the controller encodes two sets of vehicle operation information for alternate transmission over a signal line. The controller encodes a first set of engine operation parameters as a time-varying periodic signal within a first frequency range. The controller also encodes a second set of engine operation parameters as a time-varying periodic signal within a second frequency range. The controller alternately transmits the time-varying periodic signal of either the first or the second set of engine operation parameters over the signal line to a receiver (e.g., a display unit). The receiver determines whether the time-varying periodic signal is within the first or second frequency range and decodes the time-varying periodic signal accordingly to retrieve the first or second operation information.

Further aspects, features, and advantages of the present invention will become apparent from the detailed description of the preferred embodiments which follows.

BRIEF DESCRIPTION OF THE DRAWINGS

The above-mentioned and other features of the present system and method will now be described with reference to the drawings of preferred embodiments. The illustrated embodiments are intended to illustrate, but not to limit the invention. The drawings contain the following figures in which like reference numbers are used throughout the figures to represent corresponding components.

DETAILED DESCRIPTION OF PREFERRED EMBODIMENTS OF THE INVENTION

Preferred embodiments of the invention will now be described with reference to a watercraft and an outboard motor for powering the watercraft. Numerous specific details are set forth in order to provide a thorough understanding of the present invention. One skilled in the art, however, will understand that the present invention can be practiced without the specific details or with alternative devices and methods to those described herein. In other instances, well-known methods, procedures, components, and devices have not been described in detail so as not to unnecessarily obscure aspects of the present invention.

Figure 1:
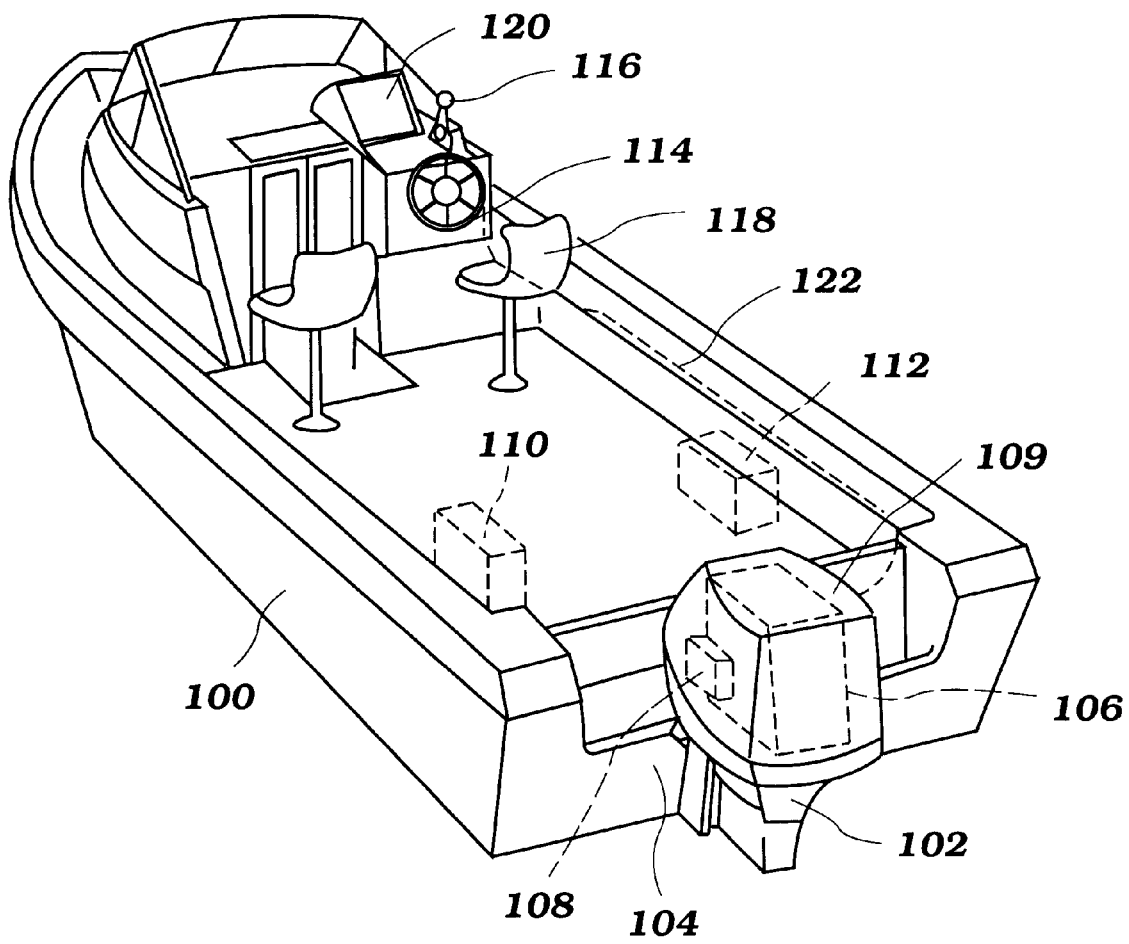
FIG. 1 illustrates a watercraft and an outboard motor that powers the watercraft.

With reference to FIG. 1, an outboard motor 102 is mounted to a transom 104 of a watercraft 100. The motor 102 includes an engine 106 and a controller (preferably an engine control unit 108), both of which are protected by an engine cowling 109. A fuel tank 110 holds fuel for the engine 106. A battery 112 stores electrical power for starting and operating the engine 106 as well as for electrical components on the watercraft 100. A steering wheel 114 and a throttle lever 116 for operating the motor 102 are positioned proximate an operator's seat 118. A display unit 120 for displaying engine operation information is also positioned proximate the operator's seat 118. The engine operation information displayed by the display unit 120 can include quantitative engine data, such as, for example, engine speed, trim angle, and engine temperature. The engine operation information can also include condition related information, such as, for example, overheating, low oil pressure, or stall. The engine operation information displayed by the display unit 120 is provided by the engine control unit 108 through a wire harness 122.

Figure 2:
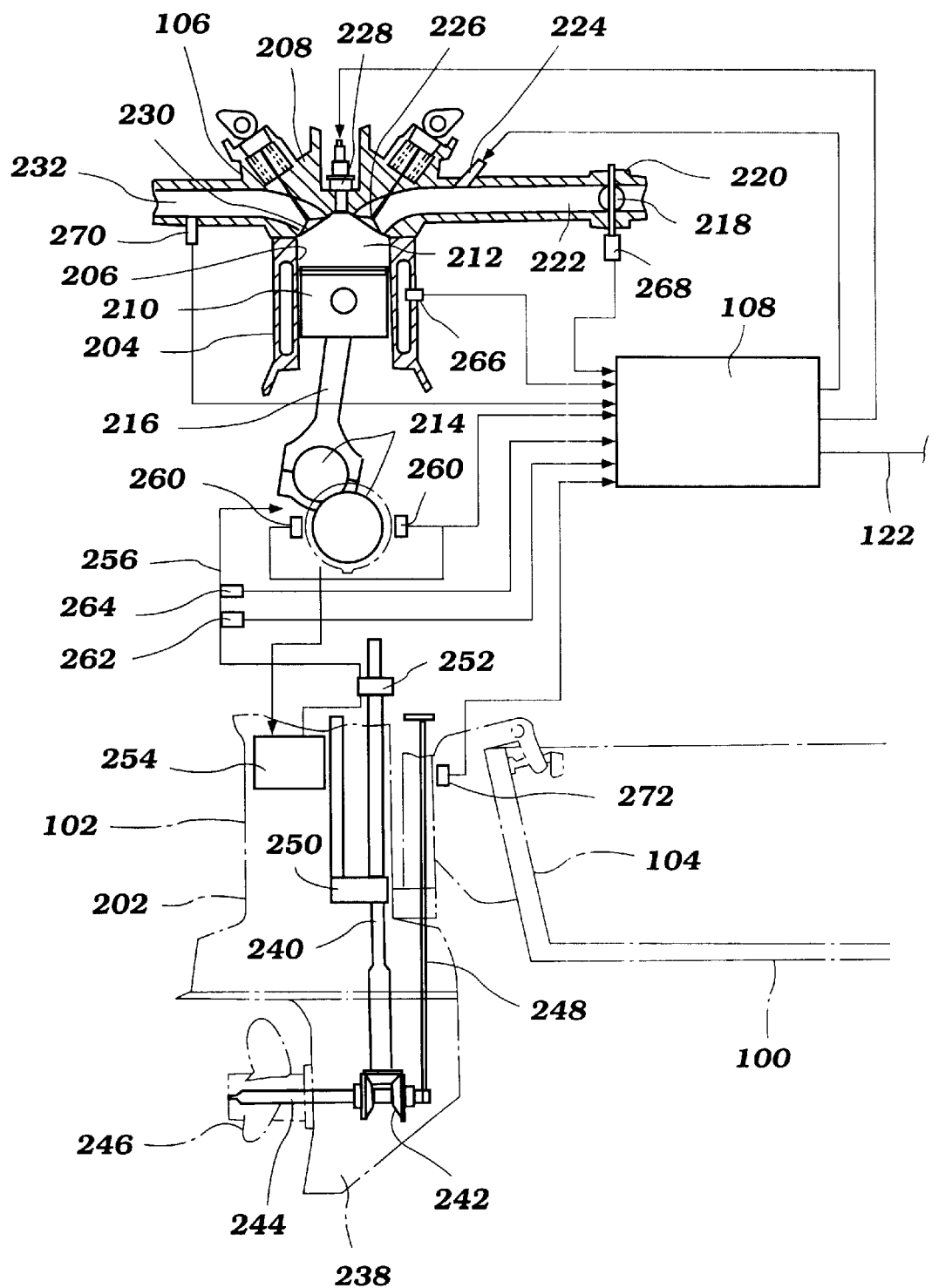
FIG. 2 illustrates a schematic diagram of the outboard motor depicting an engine, an engine control unit, and a motor casing attached to the hull of the watercraft.

With reference now to the engine 106 illustrated in FIG. 2, a cylinder block 204 has formed therein one or more cylinders 206. A cylinder head 208 is mounted to the cylinder block 204 so as to cap the ends of the cylinders 206. A piston 210 is positioned within each cylinder 206 such that the piston 210, its containing cylinder 206, and the cylinder head 208 form a combustion chamber 212. The piston 210 and cylinder 206 are configured to form a seal therebetween, but so as to allow the piston 210 to slide back and forth within the cylinder 206. The piston 210 is attached to a throw of a crankshaft 214 by a connecting rod 216.

A throttle valve 218 regulates the flow of air through a throttle body 220 and ultimately through an intake passage 222 within the cylinder head 208. A fuel injector 224 extends into the intake passage 222 and injects fuel under the control of the engine control unit 108. At least one intake valve 226 is positioned within the cylinder head 208 between the combustion chamber 212 and the intake passage 222 in order to regulate the flow of air and fuel into the combustion chamber 212. A spark plug 228 is mounted to the cylinder head 208 so as to extend into the combustion chamber 212. The spark plug 228 ignites, under the control of the engine control unit 108, the air/fuel mixture that selectively enters the combustion chamber 212. At least one exhaust valve 230 is positioned within the cylinder head 208 between the combustion chamber 212 and an exhaust passage 232 in order to regulate exhaust gasses out of the combustion chamber 212. The illustrated engine of course merely exemplifies one type of engine in connection with the present vehicle data system and associated method can be used.

With reference now to the motor casing 202 illustrated in FIG. 2, a driveshaft 240 extends down through the motor casing 202 and is driven by the crankshaft 214. In a lower casing 238, the driveshaft 240 is connected to a transmission mechanism 242 that transfers the rotation of the driveshaft 240 to a propeller shaft 244. The propeller shaft 244 extends out of the casing 202 and drives a propeller 246 mounted thereto. A shift rod 248 also extends down through the casing 202 to the transmission mechanism 242 to actuate the selection of gears.

The casing 202 also houses a water pump 250 that is driven by the driveshaft 240. The water pump 202 pumps cooling water through the cylinder block 204 and/or cylinder head 208.

An oil pump 252, also driven by the driveshaft 240, draws oil from an oil pan 254. The pump pumps the oil through one or more oil passages 256 to engine parts requiring lubrication. Of course, other types of conventional lubricant can be used with this type of lubrication system.

The motor 102 has several sensors that gather information and send the information to the engine control unit 108 for processing. A pulsar coil 260 preferably provides a pulse signal with a frequency proportional to the rotational speed of the crankshaft. An oil pressure sensor 262 provides a signal related to the oil pressure in the oil passage(s) 256. An oil temperature sensor 264 provides a signal related to the oil temperature. An engine temperature sensor 266 provides a signal related to the temperature of the engine and/or its cooling water. A throttle valve angle sensor 268 provides a signal related to the angle of the throttle valve 218. An oxygen sensor 270 provides a signal related to the oxygen content in the exhaust gasses. A trim sensor 272 provides a signal related to the trim position of the motor 102.

Figure 3:
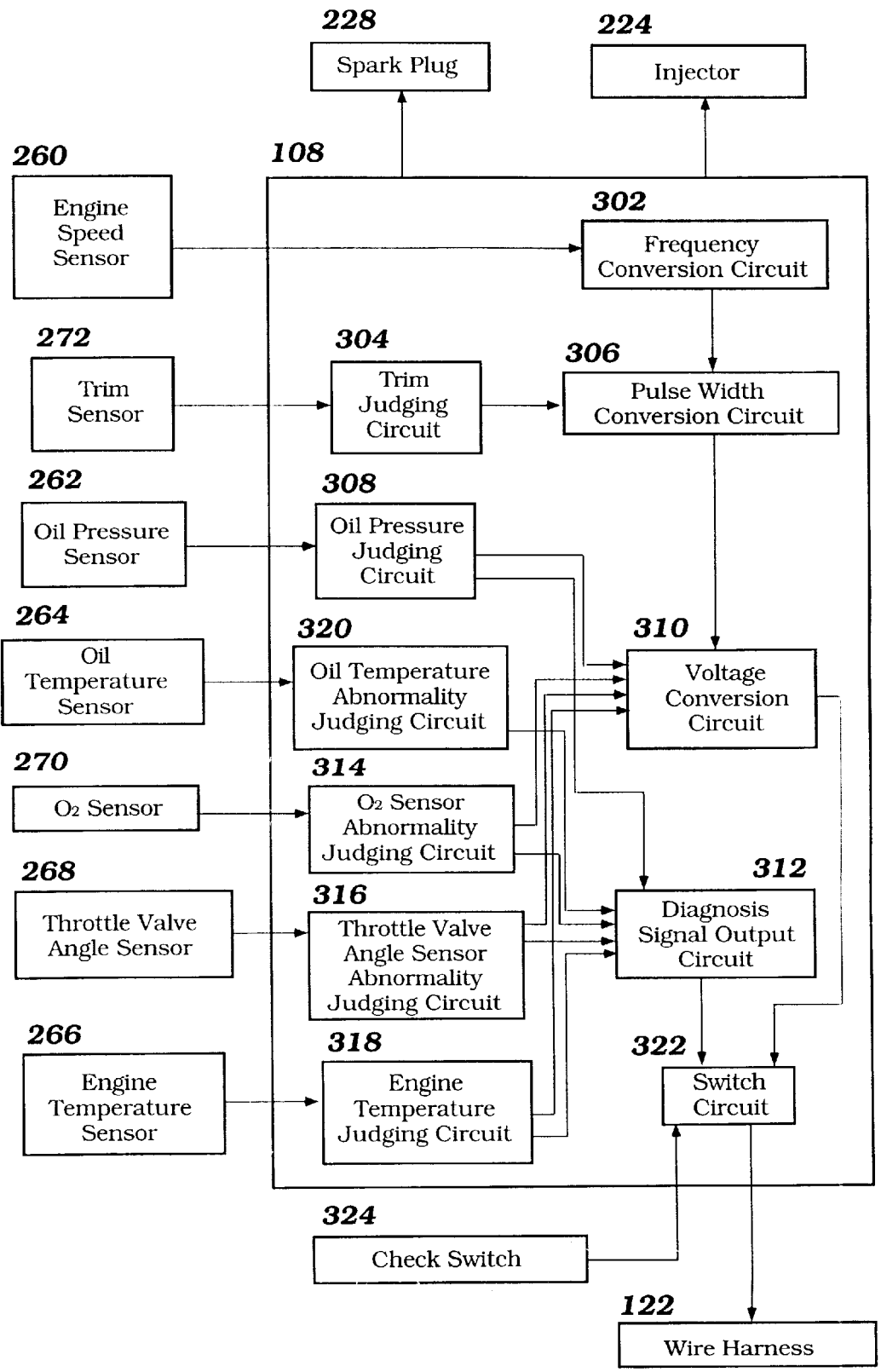
FIG. 3 illustrates a block diagram of the engine control unit and its connections to a wire harness and sensors.

As seen in FIG. 3, the engine control unit 108 collects information about the operation of the motor 102 and the engine 106 from the sensors and processes the information for presentation on the display unit 120. Although in the illustrated embodiment, the engine control unit 108 is used for this purpose and thus forms part of the vehicle data system, it is understood that a controller, which is separate from and/or in communication with the engine control unit, can be used as well.

Figure 4:
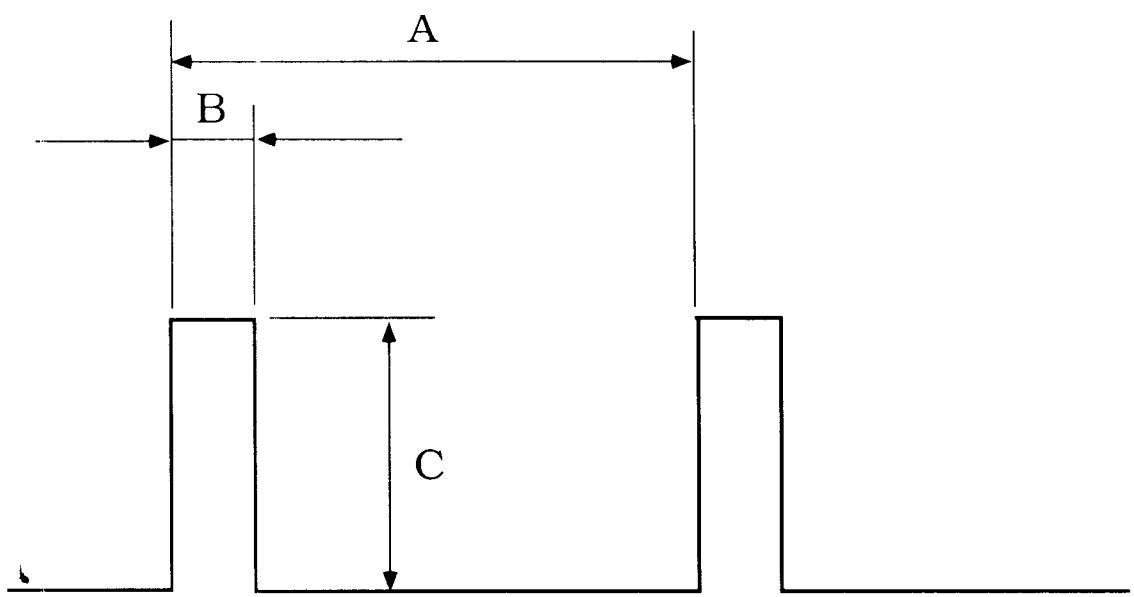
FIG. 4 is a representative portion of a pulse signal, wherein "A" represents the period (1/frequency) of the pulse signal, "B" represents the pulse width of the pulse signal, and "C" represents the pulse height.

The signal from the pulsar coil 260 is input into a frequency conversion circuit 302. The frequency conversion circuit 302 multiplies the frequency of the pulses provided by the pulsar coil 260 by a constant multiplier. Preferably, the constant is 1 in which case no multiplication is necessary. Accordingly, the frequency conversion circuit 302 provides a pulse signal of which the frequency is substantially proportional to the engine speed. As illustrated in FIG. 4, "A" represents the period (1/frequency) of the pulse signal, "B" represents the pulse width of the pulse signal, and "C" represents the pulse height.

As seen in FIG. 3, the trim sensor 272 preferably outputs the trim of the motor 102 in the form of a voltage. The voltage signal from the trim sensor 272 is input into a trim judging circuit 304 that preferably converts the voltage signal from the trim sensor 272 into one of fourteen discrete voltages. Each discrete voltage output by the trim judging circuit 304 is representative of a trim angle. The output signal of the trim judging circuit 304, in turn, is input into a pulse width conversion circuit 306. The output signal of the frequency conversion circuit 302 is also input to the pulse width conversion circuit 306. The pulse width conversion circuit 306 takes the pulse signal output by the frequency conversion circuit 302 and adjusts the pulse width "B" of the pulse signal in relation to the output signal of the trim judging circuit 304. The pulse width conversion circuit preferably provides an output signal with one of fourteen possible pulse widths. Each of the pulse widths of the output signal preferably corresponds to one of the fourteen discrete voltages output by the trim judging circuit 304 and represents one of the fourteen trim angles.

The oil pressure sensor 262 preferably outputs the oil pressure, in the form of a voltage, to an oil pressure judging circuit 308. The oil pressure judging circuit 308 compares the output voltage of the oil pressure sensor 262 to a reference voltage. If the output voltage is found to be higher, it is judged as normal and the oil pressure judging circuit 308 preferably sends a negative signal to a voltage conversion circuit 310. If the output voltage is found to be lower, it is judged to be abnormal and the oil pressure judging circuit 308 preferably sends a positive signal to the voltage conversion circuit 310. In addition, the oil pressure judging circuit 308 outputs oil pressure data detected by the oil pressure sensor 262 to a diagnosis signal output circuit 312.

The oxygen sensor 270 preferably outputs the level of oxygen in the exhaust gasses, in the form of a voltage, to an oxygen sensor abnormality judging circuit 314. If the output voltage is found to positive, it is judged as normal and the oxygen sensor abnormality judging circuit 314 preferably sends a negative signal to a voltage conversion circuit 310. If the output voltage is found to 0 Volts, it is judged to be abnormal and the oil pressure judging circuit 308 preferably sends a positive signal to the voltage conversion circuit 310. In addition, the oxygen sensor abnormality judging circuit 314 determines whether the fuel/air ratio is lean or rich based upon the output voltage of the oxygen sensor 270 and outputs this determination to the diagnosis signal output circuit 312.

The throttle valve angle sensor 268 preferably outputs the angle of the throttle valve to a throttle valve angle sensor abnormality judging circuit 316. If the output voltage is found to positive, it is judged as normal and the throttle valve angle sensor abnormality judging circuit 316 preferably sends a negative signal to a voltage conversion circuit 310. If the output voltage is found to 0 Volts, it is judged to be abnormal and the throttle valve angle sensor abnormality judging circuit 316 preferably sends a positive signal to the voltage conversion circuit 310. In addition, the throttle valve angle sensor abnormality judging circuit 316 outputs the output voltage of the throttle valve angle sensor 268 to the diagnosis signal output circuit 312.

The engine temperature sensor 266 preferably outputs the temperature of the engine, in the form of a voltage, to an engine temperature judging circuit 318. The engine temperature judging circuit 318 compares the output voltage of the engine temperature sensor 266 to a reference voltage. If the output voltage is found to be higher, it is judged as normal and the engine temperature judging circuit 318 preferably sends a negative signal to the voltage conversion circuit 310. If the output voltage is found to be lower, it is judged to be abnormal and the engine temperature judging circuit 318 preferably sends a positive signal to the voltage conversion circuit 310. In addition, the engine temperature judging circuit 318 outputs engine temperature data detected by the engine temperature sensor 266 to a diagnosis signal output circuit 312.

The oil temperature sensor 264 preferably outputs the oil temperature, in the form of a voltage, to an oil temperature abnormality judging circuit 320. The oil temperature abnormality judging circuit 320 preferably classifies the data of the output signal from the oil temperature sensor 264 into levels and outputs the classified data to the diagnosis signal output circuit 312.

The voltage conversion circuit 310 takes the pulse signal output by the pulse width conversion circuit 306 and adjusts the pulse height "C" of the pulse signal based upon the inputs from the judging circuits 308, 314, 316, 318. If all of the input signals are negative, indicating that there are no abnormalities, the voltage conversion circuit 310 preferably adjusts the pulse height "C" to be about 7 Volts. If the signal from the oil pressure judging circuit 308 is positive, the voltage conversion circuit 310 preferably adjusts the pulse height "C" to be about 8 Volts. If the signal from the oxygen sensor abnormality judging circuit 314 is positive or if the signal from the throttle valve angle sensor abnormality judging circuit 316 is positive, the voltage conversion circuit 310 preferably adjusts the pulse height "C" to be about 9 Volts. If the signal from the engine temperature judging circuit 318 is positive, the voltage conversion circuit 310 preferably adjusts the pulse height "C" to be about 10 Volts. It may be the case that more than one of the judging circuits 308, 314, 316, 318 output a positive signal simultaneously. In this case, the voltage conversion circuit 310 preferably sequentially adjusts the pulse height "C" to be the different voltages indicating the different conditions. In one embodiment, the voltage conversion circuit 310 maintains each applicable pulse height for a fixed period before sequencing on to the next applicable pulse height. In another embodiment, the voltage conversion circuit 310 sequences through another of the applicable pulse heights on each successive pulse.

The diagnosis signal output circuit 312 also receives input from the judging circuits 308, 314, 316, 318 in addition to the oil temperature abnormality judging circuit 320. The diagnosis signal output circuit 312 preferably assigns diagnostic codes, such as, for example, 0–100, based upon the sensed engine conditions. The diagnostic code 5, for example, can indicate that the air/fuel ratio is lean. The diagnosis signal output circuit 312 preferably outputs a pulse signal having a frequency related to the assigned code. The frequency range output by the diagnosis signal output circuit 312 is preferably above the maximum frequency that is output by the frequency conversion circuit 302. For example, if the maximum engine speed is 7000 RPM and the frequency conversion circuit 302 outputs a frequency ranging from 0 to 7000 Hz, the diagnosis signal output circuit 312 preferably outputs a pulse signal above 7000 to 17000 Hz. Preferably, each 100 Hz between 7000 and 17000 Hz represents one diagnostic code. For example, the diagnostic code 5, for a lean air/fuel ratio, is preferably represented by the frequency 7500 Hz. It may be the case that more than one diagnostic code is assigned by the diagnosis signal output circuit 312. In this case, the diagnosis signal output circuit 312 preferably sequences its output signal through the representative frequencies, maintaining each frequency for a duration such as, for example, 1 second.

A switch circuit 322 receives the output signal of the voltage conversion circuit 310 and the output signal of the diagnosis signal output circuit 312 and selectively outputs one of these signals. A check switch 324, when turned ON, causes the switch circuit 232 to output the output signal of the diagnosis signal output circuit 312 to the wire harness 122. When the check switch 324 is turned OFF, the switch circuit 232 outputs the output signal of the voltage conversion circuit 310 to the wire harness 122. In an additional variation, the switch circuit 232 automatically alternates between outputting the output signal of the voltage conversion circuit 310 and the output signal of the diagnosis signal output circuit 312.

The output signal of the switch circuit 322 advantageously represents several elements of engine operation information that are sent to the display unit 120 through the wire harness 122. The output signal of the switch circuit 322 is preferably carried by a single signal line. The single signal line can comprise a single wire that extends through the wire harness 122 and on which is transmitted the output signal in a direction from the switch circuit 322 to a receiver (e.g., a display unit in the illustrated embodiment). The circuit can be completed by a loop (e.g., another wire within the wiring harness 122 functioning as a return path) or by a common ground, as will be well understood by one of ordinary skill in the art.

Figure 5:
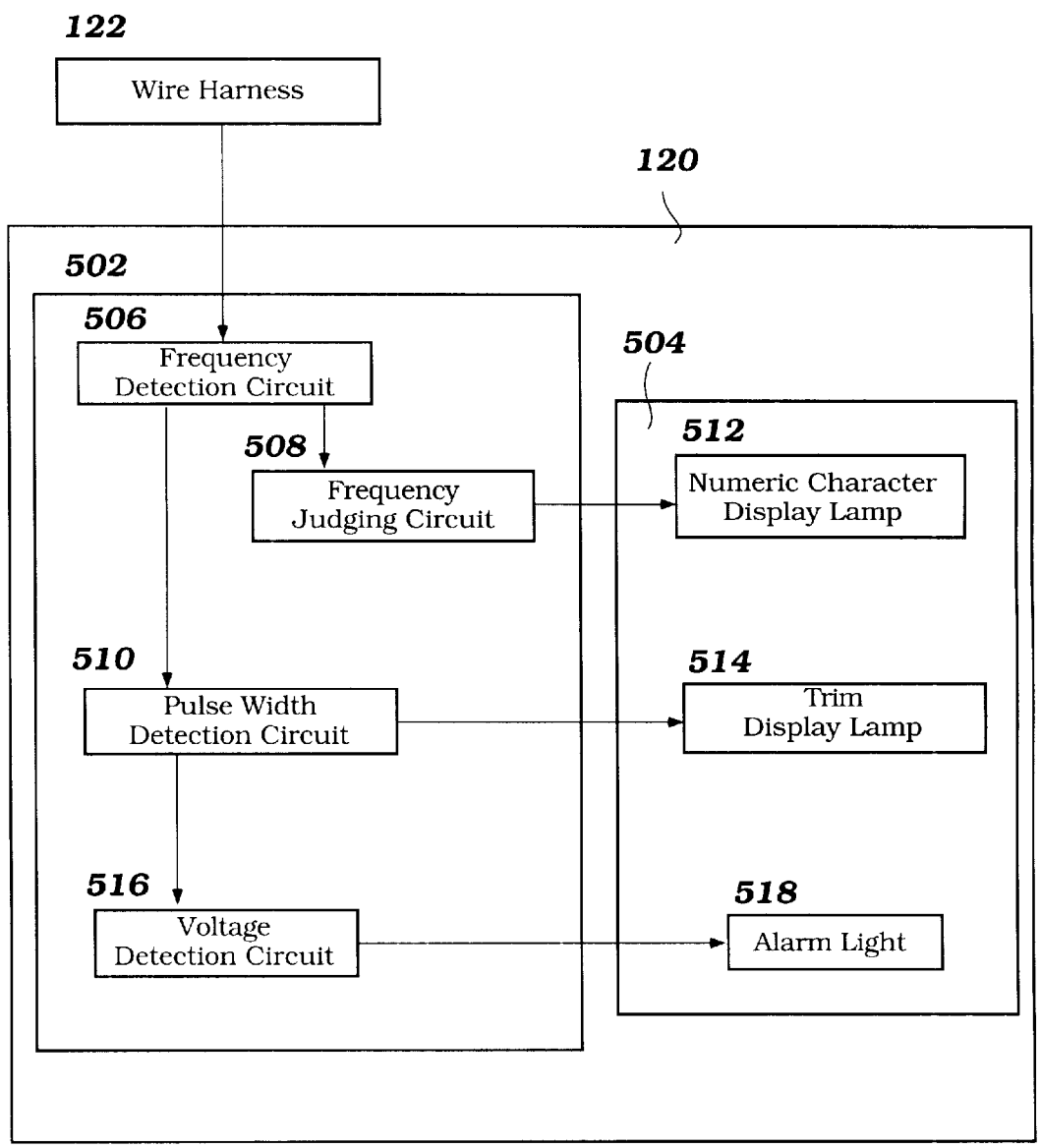
FIG. 5 illustrates a block diagram of a display unit and its connection to the wire harness.

With reference to FIG. 5, the display unit 120 preferably includes a display control unit 502 and a display 504. The display control unit 502 includes a frequency detection circuit 506 that receives the output signal of the switch circuit 232 from the wire harness 122. The frequency detection circuit 506 preferably outputs the pulse signal to a frequency judging circuit 508 and a pulse width detection circuit 510.

Figure 5A:
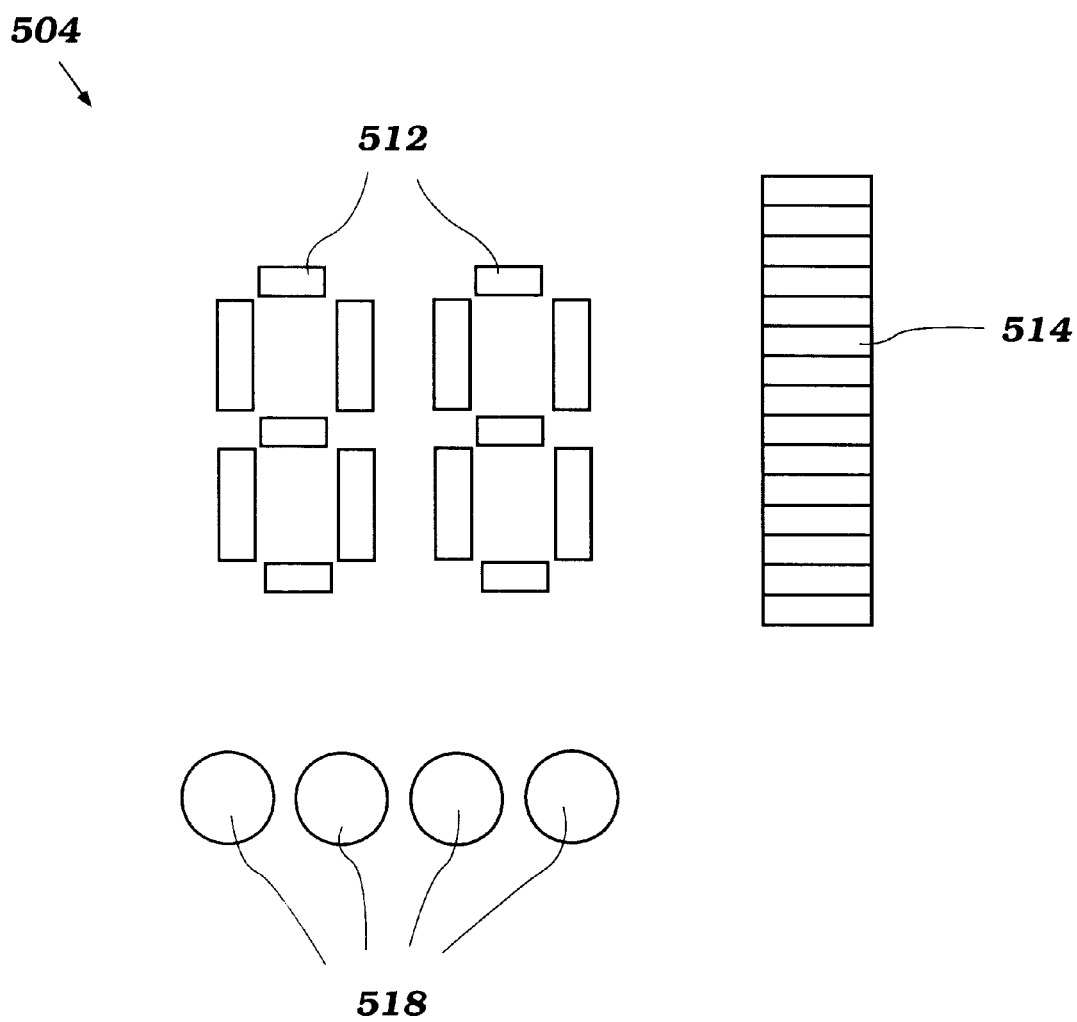
FIG. 5A illustrates the display of the display unit including a numeric character display lamp, a trim display lamp, and an alarm light.

The frequency judging circuit 508 measures the frequency of the pulse signal. If the frequency is within the range of frequencies output by the diagnosis signal output circuit 312, for example, above 7000 to 17000 Hz, the frequency judging circuit 508 decodes the signal to determine the associated diagnostic code. In the preferred embodiment, the diagnostic code is obtained from the frequency by subtracting 7000 (the base frequency) and dividing by 100 (the code multiplier). For example, a frequency of 7500 would be reduced by 7000, to get 500 and then divided by 100 to get 5 for a diagnostic code. The frequency judging circuit 508 displays the diagnostic code, "05" for example, in the numeric character display lamp 512 on the display 504 as illustrated in FIG. 5A.

As seen in FIG. 5, if the frequency of the pulse signal is below the range of frequencies output by the diagnosis signal output circuit 312, for example, 0–7000 Hz, the frequency judging circuit 508 interprets the frequency to represent the speed of the engine. Accordingly, the frequency judging circuit 508 divides the frequency by the same constant multiplier used by the frequency conversion circuit 302, if necessary, to get an engine speed. In the illustrated embodiment, the frequency judging circuit then outputs the upper two significant digits of the engine speed to be displayed on the numeric character display lamp 512.

The pulse width detection circuit 510 measures the pulse width "B" of the pulse signal output by the frequency detection circuit 506. Based upon the pulse width, the pulse width detection circuit 510 determines the degree of trim and displays the degree of trim by lighting a representative number of indicators on the trim display lamp 514 shown in FIGS. 5 and 5A.

The pulse signal is also preferably input into a voltage detection circuit 516 that determines the pulse height "C." If the pulse height is about 7 Volts, a blue alarm light 518 (FIG. 5A) is turned on to indicate that there are no abnormal conditions. If the pulse height is about 8 Volts, a yellow alarm light 518 is turned on to indicate that the oil pressure is low. If the pulse height is about 9 Volts, a red alarm light 518 is turned on to indicate that the oxygen sensor 270 or the throttle valve angle sensor 268 is sensing an abnormal condition and that the engine should be checked. If the pulse height is about 10 Volts, another yellow alarm light 518 is turned on to indicate that the engine temperature is too high.

The voltage conversion circuit 310 can be configured to function in conjunction with the voltage detection circuit 516 in order to handle multiple alarm conditions. The voltage detection circuit 516 can be configured to turn on an alarm light for a fixed period of time, such as, for example, 1 second, each time it detects a representative alarm voltage. If the same representative alarm voltage is not sent again during the subsequent 1 second period the corresponding alarm light will turn off. To function in conjunction with this configuration, the voltage conversion circuit 310 can be configured to sequence through all the voltages of the existing alarm conditions during the fixed period of time. In one embodiment, the voltage conversion circuit 310 sequences through another of the existing alarm condition voltages on each successive signal pulse. In an additional embodiment, the voltage conversion circuit 310 sends a number of pulses at the same alarm condition voltage and proceeds to the next alarm condition voltage each T/N seconds, where T represents the fixed period of time and N represents the number of possible alarm condition voltages. In the described example the fixed period of time is 1 second and there are 4 possible alarm condition voltages, e.g. 7, 8, 9, and 10 Volts. Accordingly, the voltage conversion circuit 310 switches to the next alarm condition voltage each ¼ second.

Figure 6:
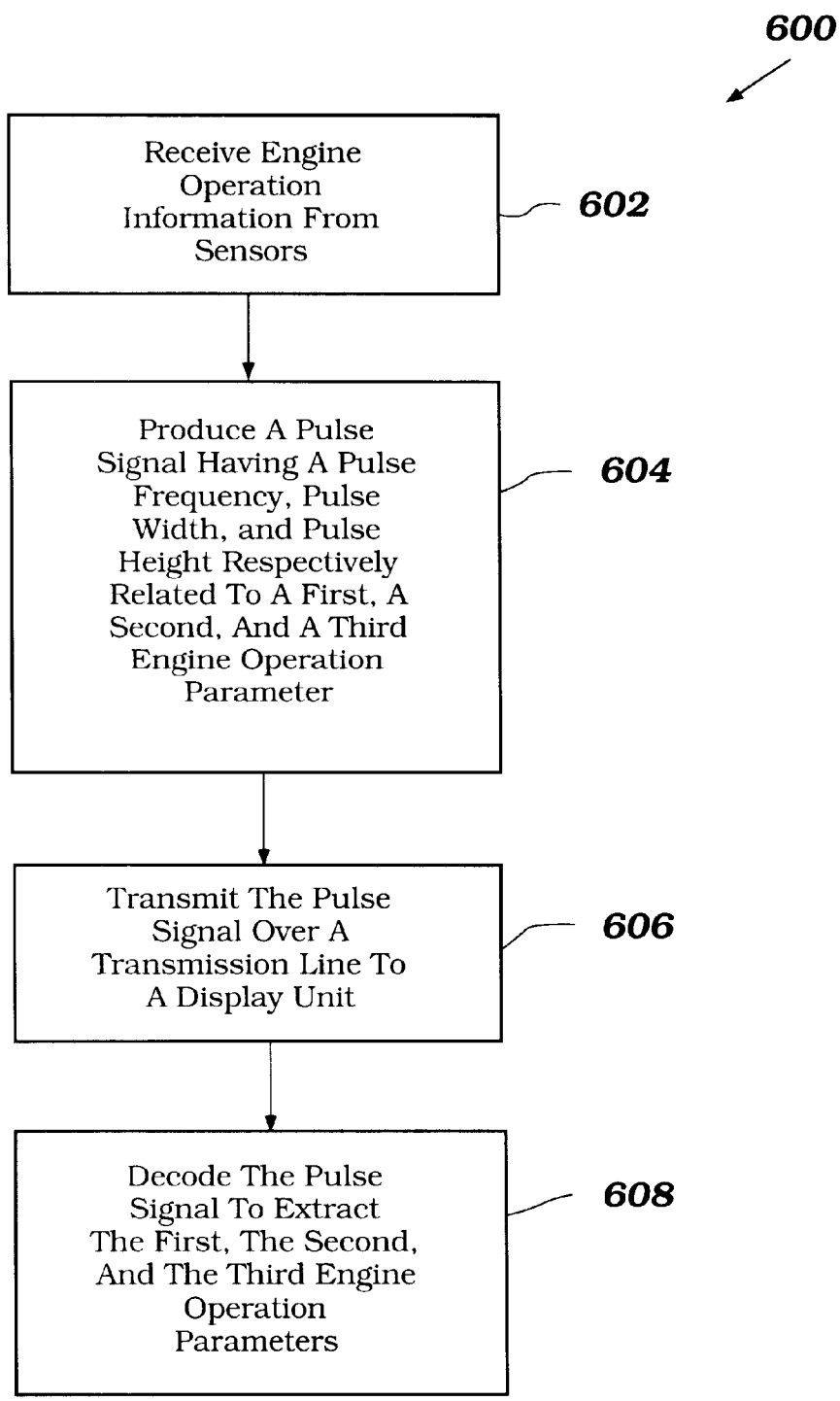
FIG. 6 is a flowchart illustrating a preferred embodiment of a process for transmitting multiple engine operation parameters over a single signal line using a pulse signal.

With reference to FIG. 6, a flowchart 600 illustrates a preferred embodiment of a process for encoding multiple engine operation parameters in a single pulse signal. The engine control unit 108 receives engine operation information from one or more sensors (as represented in operation block 602). The engine control unit 108 next produces a pulse signal having a pulse frequency, a pulse width, and a pulse height respectively related to a first, a second, and a third engine operation parameter (as represented in operation block 604). The engine control unit 108 transmits the pulse signal over a signal line to the display unit 120 (as represented in operation block 606). The display unit 120, as represented in operation block 608, decodes the signal to extract the first, the second, and the third engine operation parameters. In the preferred embodiment of the illustrated process, each step is performed continuously, processing output signals from the previous step and providing input to the next step. The engine operation parameters encoded and decoded in the pulse signal can represent any engine operation information. In the preferred embodiment, the first parameter represents engine speed, the second parameter represents the trim level of the outboard motor 102, and the third parameter represents the presence of an alarm condition related to the operation of the engine 106.

Figure 7:
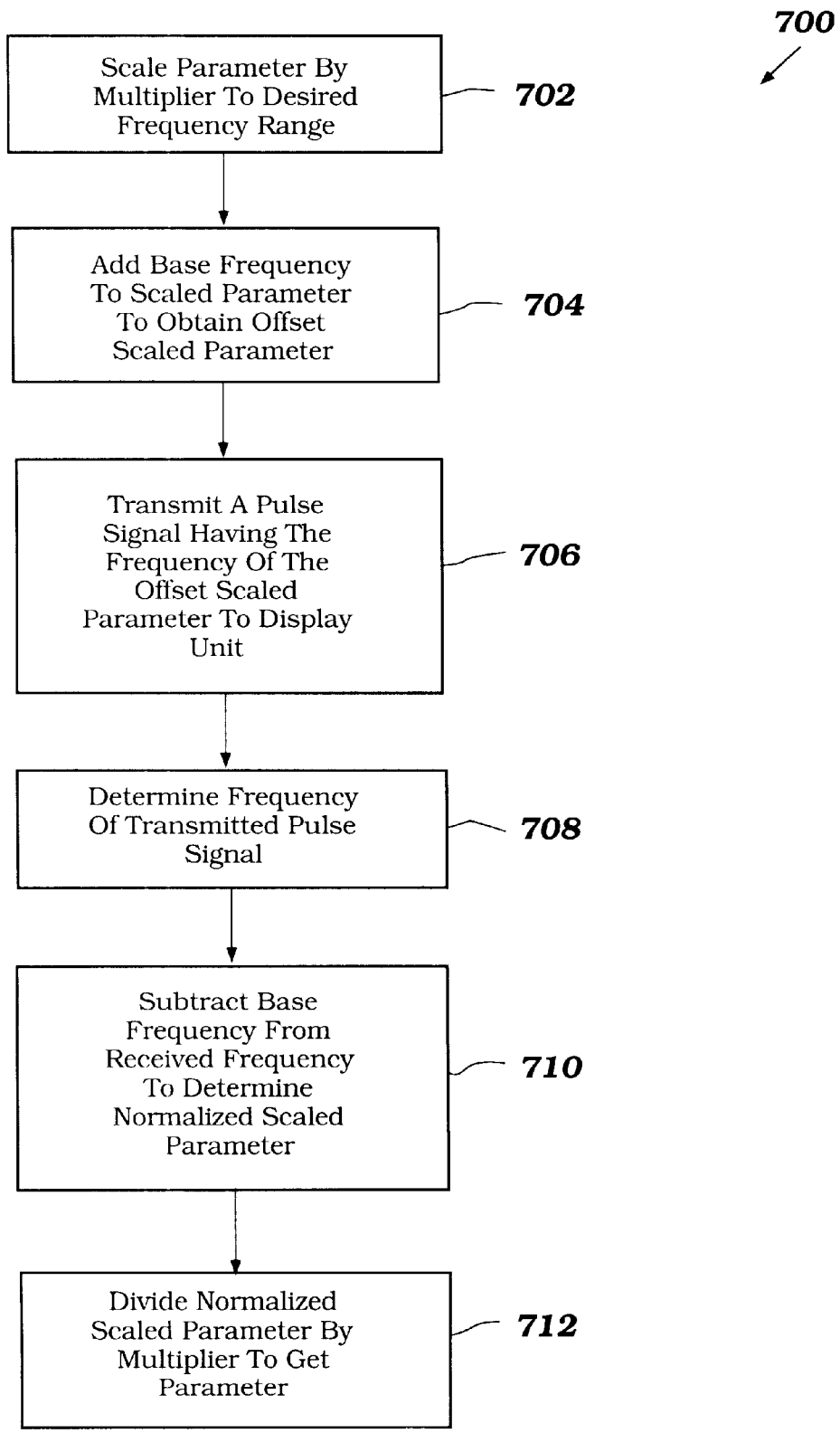
FIG. 7 is a flowchart illustrating a preferred embodiment of encoding an engine operation parameter as a pulse signal having a specific frequency range.

With reference FIG. 7, a flowchart 700 illustrates a preferred embodiment of encoding an engine operation parameter as a pulse signal within a frequency range. At a first step 702 the engine control unit 108 scales the parameter by a multiplier such that the scaled parameter's range is the same as the frequency range. At a next step 704 the engine control unit 108 adds to the scaled parameter the lowest frequency in the frequency range to yield an offset scaled parameter. At a next step 706, the engine control unit 108 transmits to the display unit 120 a pulse signal having a frequency equal to the offset scaled parameter. At a next step 708, the display unit 120 determines the frequency of the received pulse signal. At a next step 710, the display unit 120 subtracts from the received frequency the same lowest frequency in the frequency range used by the engine control unit 108 to get a normalized scaled parameter. At a next step 712, the display unit 120 divides the normalized scaled parameter by the same multiplier used by the engine control unit 108 to get the parameter itself.

Figure 8:
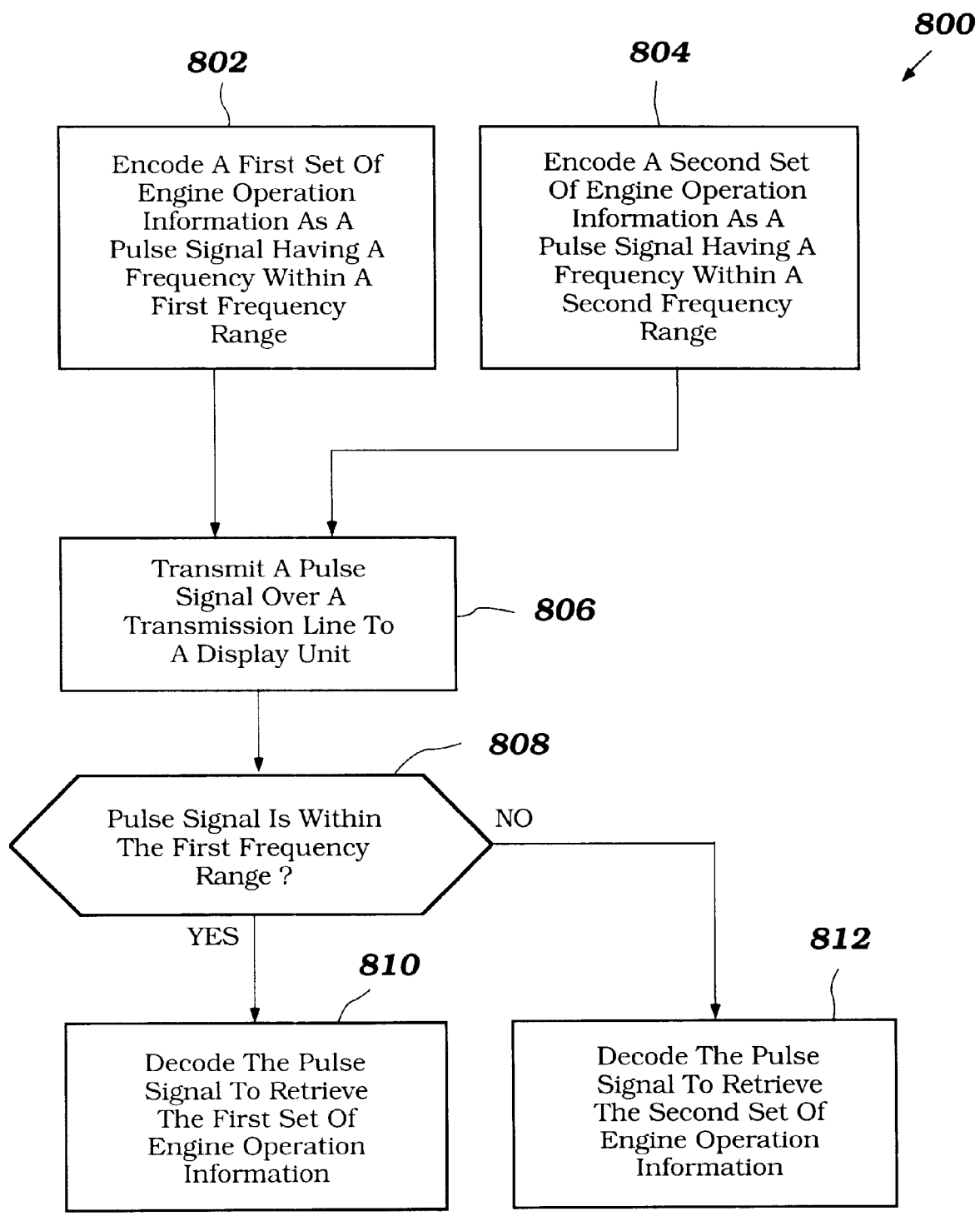
FIG. 8 is a flowchart illustrating a preferred embodiment of a process for alternately transmitting two sets of engine operation information over a single signal line using a pulse signal.

With reference to FIG. 8, a flowchart 800 illustrates a preferred embodiment of a process for encoding two sets of engine operation information for alternate transmission over a single signal line. In a step 802, the engine control unit 108 encodes a first set of engine operation information as a pulse signal having a frequency within a first frequency range. In a step 804, the engine control unit 108 encodes a second set of engine operation information as a pulse signal having a frequency within a second frequency range. The step 804 can be performed simultaneously with or as an alternative to step 802. At a step 806, the engine control unit 108 transmits the pulse signal generated in step 802 or the pulse signal generated in step 804 over a signal line to the display unit 120. At a step 808, the display unit 120 determines whether the received pulse signal is within the first frequency range. If the received pulse signal is within the first frequency range, control passes on to a step 810. At the step 810, the display unit 120 decodes the pulse signal to retrieve the first set of engine operation information. If the received pulse signal is not within the first frequency range, the decoding display unit proceeds to step 812. At the step 812, the display unit 120 decodes the pulse signal to retrieve the second set of engine operation information. Each set of engine operation information can be encoded using the process for encoding multiple engine operation parameters in a single pulse signal illustrated in FIG. 6. Additionally, each set of engine operation information can be encoded using the process of encoding an engine operation parameter within a frequency range illustrated in FIG. 7.

In an additional embodiment of the present invention, the engine 106 is a two-cycle engine that uses an oil injection lubrication system. In this embodiment, the pulse height represents the level of oil in a lubrication oil tank. An oil level sensor provides a signal indicative of the level of oil in the tank. The voltage conversion circuit 310 takes the output signal of the oil level sensor and adjusts the pulse height accordingly. As the oil level decreases, the voltage conversion circuit 310 increases the pulse height such that, for example, 7 Volts represents a full tank, 8 Volts represents ¾ of a tank, 9 Volts represents ½ of a tank, and 10 Volts represents ¼ of a tank, etc.

In another embodiment of the present invention, the frequency judging circuit 508 is connected to the alarm lights 518. The diagnosis signal output circuit 312 is configured to output frequencies, such as, for example, 8000, 9000, 10000, and 11000 Hz to indicate that the frequency judging circuit 508 should illuminate the respective alarm lights 518.

Another embodiment of the present invention eliminates the frequency judging circuit 508. In this embodiment, the diagnosis signal output circuit 312 outputs the diagnosis signal in the same frequency range as the frequency conversion circuit 302 uses to represent engine speeds, such as, for example 0–10000 Hz. When the check switch 324 is turned ON, the system user will know that diagnostic codes are being displayed on the display unit 120. In this embodiment, the diagnosis signal output circuit 312 can be configured to represent a diagnosis code using a sequence of engine speeds displayed on the numeric character display lamp 512. For example, the diagnosis code "23" could be represented by transmitting the pulse frequencies representing engine speeds as follows: 2000 RPM (2 seconds), 0 RPM (2 seconds), 3000 RPM (2 seconds), 0 RPM (5 seconds). In this example, each numeral of a diagnosis code is represented by an engine speed divided by 1000. Numerals are preferably displayed for two seconds, and separated by a two second display of 0 RPM. A five second 0 RPM display preferably follows display of the second numeral of the diagnosis code.

While certain exemplary preferred embodiments have been described and shown in the accompanying drawings, it is to be understood that such embodiments are merely illustrative of and not restrictive on the invention. Further, it is to be understood that this invention shall not be limited to the specific construction and arrangements shown and described because various modifications or changes can occur to those of ordinary skill in the art without departing from the spirit and scope of the invention as claimed. It is intended that the scope of the invention be limited not by this detailed description but by the claims appended hereto.

What is claimed is:

1. A vehicle data system for encoding, transmitting, and decoding vehicle operation data, the system comprising a first sensor configured to sense a first operation parameter, a second sensor configured to sense a second operation parameter, a third sensor configured to sense a third operation parameter, a controller connected to the sensors to receive signals indicative of the sensed first, second and third operation parameters, the controller configured to generate a time-varying periodic signal having a repetition frequency related to the first operation parameter, an amplitude as measured between high and low values related to the second operation parameter, and a ratio of time spent at the high value relative to the time spent at the low value related to the third operation parameter, a signal line connected to the controller to transmit the time-varying periodic signal from the controller to a receiver, the receiver configured to decode the time-varying periodic signal to determine and the first, second and third operation parameters.

2. The vehicle data system of claim 1, wherein the receiver is a display unit including a display panel, and is configured to display the first, second and third operation parameters.

3. The vehicle data system of claim 1, wherein the controller is configured to generate a pulse signal having a repetition frequency, height and width related to the first, second and third operation parameters, respectively.

4. The vehicle data system of claim 3, wherein the controller is configured to generate a square-wave signal.

5. The vehicle data system of claim 1, wherein the high and low values generated by the controller are high and low voltages, and the low voltage is a reference voltage and the high voltage is generated to relate to the second operation parameter.

6. The vehicle data system of claim 5, wherein the controller is configured to generate a pulse voltage signal.

7. The vehicle data system of claim 6, wherein the first sensor is an engine speed sensor, and the controller includes a frequency conversion circuit such that the repetition frequency of the pulse signal generated by the controller is proportionate to the sensed engine speed.

8. The vehicle data system of claim 7, wherein the second sensor is a trim sensor, and the controller includes a pulse width conversion circuit such that a width of the pulse signal generated by the controller is related to a sensed trim angle.

9. The vehicle data system of claim 8, wherein the controller includes a trim judging circuit to quantize the signal from the trim sensor, and the trim judging circuit outputs a quantized signal to the pulse width conversion circuit.

10. The vehicle data system of claim 8, wherein the third sensor is an engine operation sensor, and the controller additionally includes an engine operation judging circuit connected to the engine operation sensor and configured to determine whether the sensed engine operation condition is normal and to output a signal indicative of the normalcy of the engine operation condition, and a voltage conversion circuit that communicates with the engine operation judging circuit, the voltage conversion circuit configured adjust the height of the pulses within the pulse signal to relate to the normalcy of the sensed engine operation condition.

11. The vehicle data system of claim 10, wherein the engine operation sensor is selected from a group consisting of an oil pressure sensor, an oil temperature sensor, an oxygen sensor, a throttle valve angle sensor and an engine temperature sensor.

12. The vehicle data system of claim 10 additionally comprising another engine operation sensor and a corresponding engine operation judging circuit connected to the another engine operation sensor, the engine operation judging circuit also being connected to the voltage conversion circuit.

13. The vehicle data system of claim 10, wherein the engine operation judging circuit also is connected to a diagnosis signal output circuit, and the controller additionally includes a switch circuit that receives signals from both the diagnosis signal output circuit and the voltage conversion circuit, the switching circuit being configured to selectively output to the signal line one of the signals received from the diagnosis signal output circuit and the voltage conversion circuit.

14. A method for encoding vehicle operation data in a signal, the method comprising:
providing a time-varying periodic signal, wherein the period of the signal is related to a first vehicle operation data;
adjusting the amplitude of the time-varying periodic signal, wherein the adjusted amplitude of the time-varying periodic signal is related to a second vehicle operation data; and
adjusting a portion of the period during which the signal is above a reference value, wherein the duration of the portion is related to a third vehicle operation data.

15. The method of claim 14, wherein the time-varying periodic signal is a pulse signal.

16. A method of encoding vehicle operation data in a signal, the method comprising:
providing a pulse signal;
adjusting the frequency of the pulse signal in relation to a first vehicle operation parameter;
adjusting the pulse height of the pulse signal in relation to a second vehicle operation parameter; and
adjusting the pulse width of the pulse signal in relation to a third vehicle operation parameter.

17. An apparatus for encoding vehicle operation data, the apparatus comprising a pulse generator configured to generate a periodic pulse signal indicative of a first operation data, a pulse width conversion circuit communicating with the pulse generator and being configured to adjust pulse widths within the pulse signal in relation to a second operation data, and a voltage conversion circuit communicating with the pulse generator and being configured to adjust pulse heights within the pulse signal in relation to a third operation data.

18. The apparatus of claim 17 additionally comprising a frequency conversion circuit connected to the pulse generator and configured to produce an output signal which is proportionate to the signal output by the pulse generator.

19. A method for encoding vehicle operation data in a signal, the method comprising providing an engine operation parameter having a frequency, scaling the parameter to have a frequency within a first frequency range, offsetting the frequency by a base frequency to produce an offset frequency occurring within a second frequency range, the second frequency range not overlapping with the first frequency range, producing a time-varying periodic signal at the offset frequency, transmitting the time-varying signal through a signal line, and decoding the time-varying periodic signal to determine the value of the vehicle operation parameter.

20. The method of claim 19, wherein the first frequency range corresponds to a range of rotational speeds of an engine of the vehicle.

21. A method of transmitting a plurality of vehicle operation information over a signal line, the method comprising:
associating a first frequency range with a first set of operation information;
associating a second frequency range with a second set of operation information,
wherein the second frequency range does not overlap the first frequency range;
encoding the first set of operation information as a first time-varying periodic signal having a frequency within the first frequency range;
encoding the second set of operation information as a second time-varying periodic signal having a frequency within the second frequency range;
transmitting one of the first and second time-varying periodic signals over a signal line to a receiver; and
determining, at the receiver, whether the transmitted time-varying periodic signal represents the first set of operation information based upon the frequency of the transmitted pulse signal.

22. The method of claim 21, wherein the receiver is a display unit including a display panel, and is configured to display the first and second operation information.

* * * * *

UNITED STATES PATENT AND TRADEMARK OFFICE
CERTIFICATE OF CORRECTION

PATENT NO.   : 6,377,879 B2
DATED        : April 23, 2002
INVENTOR(S)  : Isao Kanno It is certified that error appears in the above-identified patent and that said Letters Patent is hereby corrected as shown below:

<u>Title page,</u>
Item [56], References Cited, U.S. PATENT DOCUMENTS, the following references should be added:

```
--      3,950,700 A   4/1976    Weisbart................324/177
        4,594,572 A   6/1986    Haubner et al...........340/52
        5,698,974 A   12/1997   Van Dyke et al..........324/144 --
```

Signed and Sealed this

Fifth Day of November, 2002

Attest:

JAMES E. ROGAN
Attesting Officer          Director of the United States Patent and Trademark Office